Patented Aug. 29, 1933

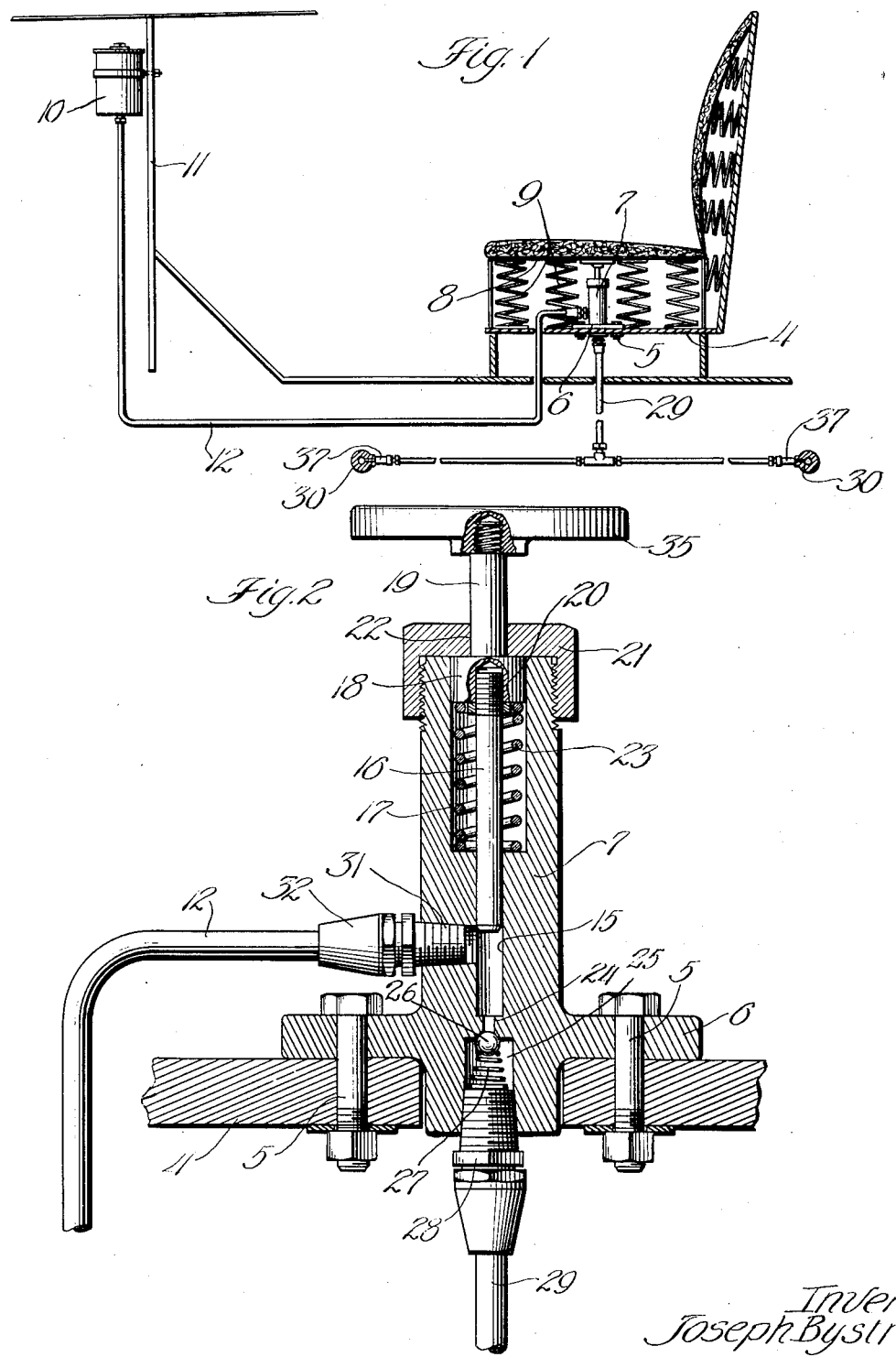

1,924,707

UNITED STATES PATENT OFFICE 1,924,707

PUMP FOR LUBRICATING APPARATUS

Joseph Bystricky, Chicago, Ill., assignor to Alemite Corporation, Chicago, Ill., a corporation of Delaware Application November 16, 1929
Serial No. 407,641

9 Claims. (Cl. 184—7)

My invention relates to a lubricant pump unit for use in the so-called centralized systems of lubrication for lubricating a plurality of bearings from a single source of lubricant supply through branched conduits to the bearings to be lubricated, and metering means in the conduits and adjacent the bearings to control the quantity of lubricant supplied to each bearing. My invention is particularly designed for use with the centralized lubricating systems applied to automotive vehicles.

An object of my invention is to provide an improved pump unit for use as a part of the centralized lubricating system of automotive vehicles.

Another object of my invention is to provide a new and novel method of operating the pump of such a system.

Another object of my invention is to provide an improved pump unit which is combined with the driver's seat of an automotive vehicle and responsive to movements of the seat.

Another object of my invention is to provide an improved pump unit for use with a centralized system of lubrication, which pump unit is located within the driver's seat of an automotive vehicle and operable by the vertical movements of the seat when occupied by the driver.

Another object of my invention is to provide an improved pump unit in such a system which is located within the driver's seat and operable by movements of said seat, in combination with a lubricant reservoir for use in said system, which reservoir is located in the engine compartment of the automotive vehicle.

Further objects and advantages of my invention will become more apparent from the following detailed description and accompanying drawing, in which Fig. 1 is a diagrammatic sectional elevation of the seat of an automotive vehicle showing the pump of my invention attached thereto and showing a lubricant reservoir and branched conduit units connecting the pump with bearings; and Fig. 2 is an enlarged cross sectional view of the pump of my invention.

Referring now to the drawing in which like numerals designate like parts throughout the several views, I have illustrated my new and improved pump mounted upon a seat frame 4 of an automotive vehicle by means of bolts 5 which pass through the flange 6 which is part of the main casting 7 of my pump unit. A light metal strip 8 is suitably mounted across the top of the seat frame 4, thereby forming an enclosure for the springs 9 of the seat. A lubricant reservoir 10 of any well-known suitable type is mounted on the dash 11 of an automotive vehicle and is connected with the pump of my invention by means of a conduit 12 in a suitable manner as will hereinafter be described.

The main casting 7 is cylindrical in shape except for the mounting flange 6 and has a central bore 15 which forms the pump cylinder in which is reciprocably mounted a pump piston 16. The bore 15 is enlarged at the upper end of the casting 7 to form a chamber 17 in which is reciprocably mounted the enlarged end 18 of a guide stem 19 which is screw threaded at 20 to the pump piston 16.

A cap 21 is screw threaded over the upper end of the casting 7 and has an aperture 22 therein through which the guide stem 19 passes but which aperture is of a smaller diameter than the enlarged end 18 of the guide stem, serving as a stop therefor to prevent withdrawal of the stem from the chamber 17. A compression spring 23 is disposed between the enlarged end 18 of the guide stem 19 and the bottom of the chamber 17, serving normally to cause the enlarged portion 18 of the guide stem 19 to abut the cap 21 and maintain the pump piston 16 in the raised position as shown in Fig. 2. The bottom of the pump cylinder is reduced at 24 to form a small discharge port which opens into an enlarged valve chamber 25. A ball check valve 26 is seated against the lower end of the port 24 and maintained in position by a compression spring 27.

A suitable pipe connection or union 28 is screw threaded in the lower portion of the valve chamber 25 and forms a seat for the spring 27 and also a leak-proof connection with a conduit or feed line 29 which leads to various bearings 30 to be lubricated. A cross bore 31 is formed in the side wall of a casting 7 and communicates with the pump cylinder 15. A suitable pipe connection 32 is screw threaded in the bore 31 and forms a leak-proof connection with the conduit 12 which leads to the reservoir 10. An operating head 35 is screw threaded at the top of the guide stem 19 and is adapted to contact with the under side of the metal strip 8 which is mounted across the top of the springs of the seat of the automotive vehicle as illustrated in Fig. 1. The parts are designed to allow such contact to be made with the head 35 when the seat is in the position illustrated in Fig. 1, without an occupant, that is, with the springs 9 in normal position when no weight is placed upon the seat.

In the operation of my device the reservoir 10 is filled with a suitable lubricant which thereafter flows through the conduit 12 into the pump cylinder 15 when the pump piston 16 is in the raised position illustrated in Fig. 2, which will be the condition when the driver's seat is unoccupied. When the metal strip 8 is flexed downwardly, due to weight being placed upon the seat such as the driver occupying the seat, the head 35 which is in contact with the metal strip 8 will be moved downwardly, compressing the spring 23 located within the chamber 17 and forcing the pump piston 16 downwardly in the pump cylinder 15. As the pump piston 16 is moved past the bore 31 it will act as a valve and close the bore 31 so that lubricant will be entrapped in the lower part of the pump cylinder 15. Further downward movement of the pump piston 16 will force the lubricant through the port 24, moving the ball check valve 26 from its seat and forcing the lubricant into the conduit 29 from whence it will be fed to the bearings 30, passing first through suitable metering devices 37 which are located before each bearing and which are well known in the art.

When the driver leaves the seat and pressure on the metal strip 8 is removed the pump piston 16 will be raised by the spring 23 which will create a suction in the pump cylinder 15 when the valve 26 is seated and draw a fresh charge of lubricant into the pump cylinder 15 through the conduit 12 from the reservoir. It will be seen that a continued pumping action of the piston 16 up and down within the cylinder 15 will draw lubricant from the reservoir 10 and force it through the conduit 29 to the bearings 30.

In the use of this device it will be necessary to first charge the system by several pumping actions in order to fill the branched conduits 29. Thereafter the operator need give the system no further attention than to fill the reservoir 10 when needed.

The pump operates automatically throughout the use of the vehicle to keep the system charged with lubricant by reason of the vertical motion of the seat as the driver uses the vehicle, occupying and leaving the seat. The diameter of the pump cylinder 15 is relatively small and the effective stroke for forcing lubricant into the system is relatively short so that only a very small quantity of lubricant will be forced into the system with each movement of the pump. It will be found in use that such a small charge is practical and will maintain the system full of lubricant at all times with no danger of overcharging.

Having thus described my invention, what I claim is:

1. A system of centralized lubrication for use in automotive vehicles, comprising bearings to be lubricated, a reservoir containing lubricant, a resilient seat depressible upon application of weight in said vehicle, and a pump supplied with lubricant from said reservoir, said pump disposed within said seat and operatively connected therewith whereby movements of the seat operate the pump to force lubricant to the bearings.

2. A system of centralized lubrication for use in automotive vehicles, comprising a reservoir containing lubricant, a spring mounted seat in said vehicle adapted to vertical movements, a lubricant pump disposed within said seat and responsive to vertical movements of the seat, and conduits connecting the reservoir, pump and bearings whereby lubricant is forced from the reservoir to the bearings by the pump upon vertical movements of the seat.

3. A system of centralized lubrication for use in automotive vehicles, comprising a reservoir containing lubricant, bearings to be lubricated, a pump connected with the reservoir and bearings for forcing lubricant from the reservoir to the bearings, a weight depressible seat in said vehicle, and means to operatively connect said pump and seat whereby the movements of said seat operate the pump.

4. A system of centralized lubrication for use in automotive vehicles, comprising bearings to be lubricated, a reservoir containing lubricant, a spring mounted seat in said vehicle adapted to vertical movements, a flexible top on said seat, a pump connected with said reservoir and bearings, a piston within said pump to force lubricant from the reservoir to the bearings, a head on said piston adapted to contact with the flexible top of the seat, and a spring to maintain said head in contact with said seat whereby vertical movements of the seat operate the pump.

5. A system of centralized lubrication for use in automotive vehicles, comprising bearings to be lubricated, a reservoir containing lubricant, a spring mounted seat in said vehicle adapted to vertical movements, a flexible top on said seat, a lubricant pump connected with the reservoir and the bearings and mounted within said seat, a piston within said pump for forcing lubricant into the bearings, a head on said piston adapted to contact with the flexible top of the seat whereby the piston will be moved downwardly to discharge lubricant upon flexing of the top of said seat, and means to maintain said head in contact with said seat at all times whereby to raise said piston when the seat is relieved.

6. In a system of centralized lubrication for use in automotive vehicles, a plurality of bearings to be lubricated, a reservoir containing lubricant to be fed to the bearings, a seat in said vehicle, a pump for forcing lubricant to the bearings comprising a pump cylinder, a pump piston reciprocable therein, an inlet port connected with the reservoir, a discharge port connected with the bearings, and means to operatively connect the piston and seat to cause reciprocation of the piston with the seat.

7. In a system of centralized lubrication for use in automotive vehicles, a plurality of bearings to be lubricated, a reservoir containing lubricant, a spring mounted seat in said vehicle adapted to vertical movements, a lubricant pump disposed within the seat and operatively connected therewith to be responsive to vertical movements of the seat, a piston reciprocable within said pump adapted to discharge lubricant from the pump to the bearings upon downward movements of the seat, and a spring to return said piston to its normal position upon upward movements of the seat.

8. A system of centralized lubrication for use in automotive vehicles comprising bearings to be lubricated, a reservoir containing lubricant, a seat capable of being depressed by weight in said vehicle, and pump means supplied with lubricant from said reservoir, said pump means disposed within said seat and operatively connected therewith whereby movements of the seat operate to allow lubricant to pass to the bearings.

9. A system of centralized lubrication for use in automotive vehicles comprising a reservoir containing lubricant, a spring mounted seat in said vehicle adapted to vertical movements, valve means disposed within said seat and responsive to vertical movements of the seat, and conduits connecting the reservoir, valve and bearings whereby lubricant may pass from the reservoir to the bearings through the valve upon vertical movements of the seat.

JOSEPH BYSTRICKY.